(12) United States Patent
Van Buskirk

(10) Patent No.: US 9,410,565 B2
(45) Date of Patent: Aug. 9, 2016

(54) ORIFICE PLATES

(71) Applicant: Paul D. Van Buskirk, Spring, TX (US)

(72) Inventor: Paul D. Van Buskirk, Spring, TX (US)

( * ) Notice: Subject to any disclaimer, the term of this patent is extended or adjusted under 35 U.S.C. 154(b) by 0 days.

(21) Appl. No.: 14/953,533

(22) Filed: Nov. 30, 2015

(65) Prior Publication Data

US 2016/0076565 A1 Mar. 17, 2016

Related U.S. Application Data

(63) Continuation of application No. 14/489,149, filed on Sep. 17, 2014, now Pat. No. 9,200,650.

(60) Provisional application No. 61/937,693, filed on Feb. 10, 2014, provisional application No. 61/883,069, filed on Sep. 26, 2013.

(51) Int. Cl.
*F15D 1/02* (2006.01)
*G01F 1/42* (2006.01)
*F15D 1/00* (2006.01)

(52) U.S. Cl.
CPC .............. *F15D 1/025* (2013.01); *F15D 1/001* (2013.01); *G01F 1/42* (2013.01)

(58) Field of Classification Search
CPC ............ F15D 1/025; F15D 1/001; F15D 1/42
USPC ................... 138/44, 40; 366/176.1, 340, 366; 73/861.52, 861.61
See application file for complete search history.

(56) References Cited

U.S. PATENT DOCUMENTS

| | | | |
|---|---|---|---|
| 3,545,492 A | 12/1970 | Scheid, Jr. | |
| 3,878,870 A | 4/1975 | Atherton et al. | |
| 5,341,848 A | 8/1994 | Laws | |
| 5,918,637 A | 7/1999 | Fleischman | |
| 7,051,765 B1 | 5/2006 | Kelley et al. | |
| 7,621,670 B1 | 11/2009 | England et al. | |

FOREIGN PATENT DOCUMENTS

IN    653/MUMNP/2010    8/2010

OTHER PUBLICATIONS

Van Buskirk, P., "Thermodynamic and Transport Analyses of a Bernoulli Flow Meter system for Any Real Fluid". Apr. 2006. [retrieved on Nov. 23, 2014]. Retrieved from online. <URL: http://www.aplusflowtek.com/_papers/PTK-8-3_R1.pdf> figures 13-14; pp. 17-18, table 3; p. 22, paragraphs 1, 3-4; p. 27, paragraphs 1-2; p. 36, paragraphs 2-3.

*Primary Examiner* — Patrick F Brinson
(74) *Attorney, Agent, or Firm* — Asgaard Patent Services, LLC; F. Wayne Thompson, Jr.

(57) ABSTRACT

Implementations of an orifice plate used to regulate flow through a conduit are provided. In some implementations, a balanced restriction orifice (BRO) plate configured to maximize pressure loss is provided. In some implementations, the BRO plate may be configured to limit pipe and plate noise, erosion, cavitation, shear stress, etc. while maximizing pressure loss, and limiting flow to required values. In some implementations, openings through a BRO plate may be configured to satisfy the Velocity-Head Pressure-Loss equation: $\Delta P = k \rho V^n / 2Gc$.

16 Claims, 12 Drawing Sheets

VIEW A-A

KNIFE EDGE
HIGH k (>1)
(TYPICALLY)

CONTOURED EDGE
LOW TO VERY LOW k (<<1)

BLUNT EDGE
HIGH TO MODERATE k

TAPERED BEVELED EDGE
MODERATE TO LOW k

BI-DIRECTIONAL EDGE

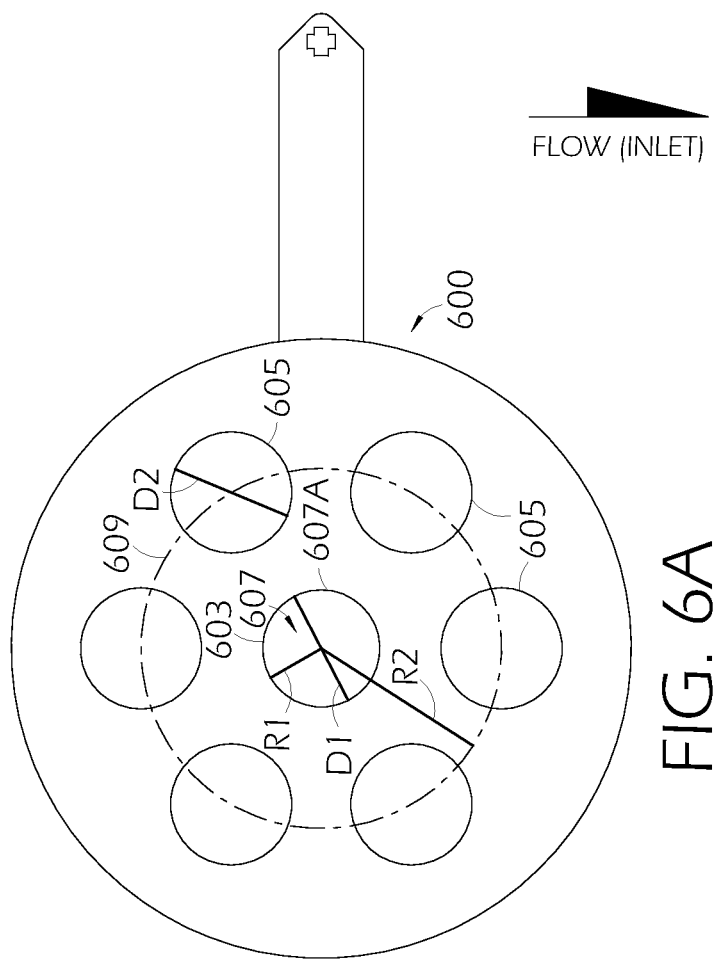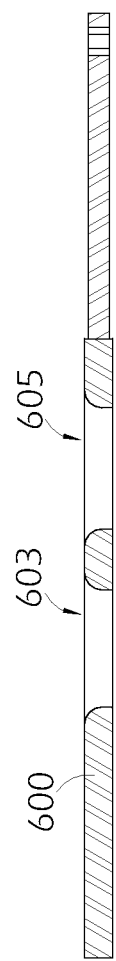
FIG. 6A
FIG. 6B

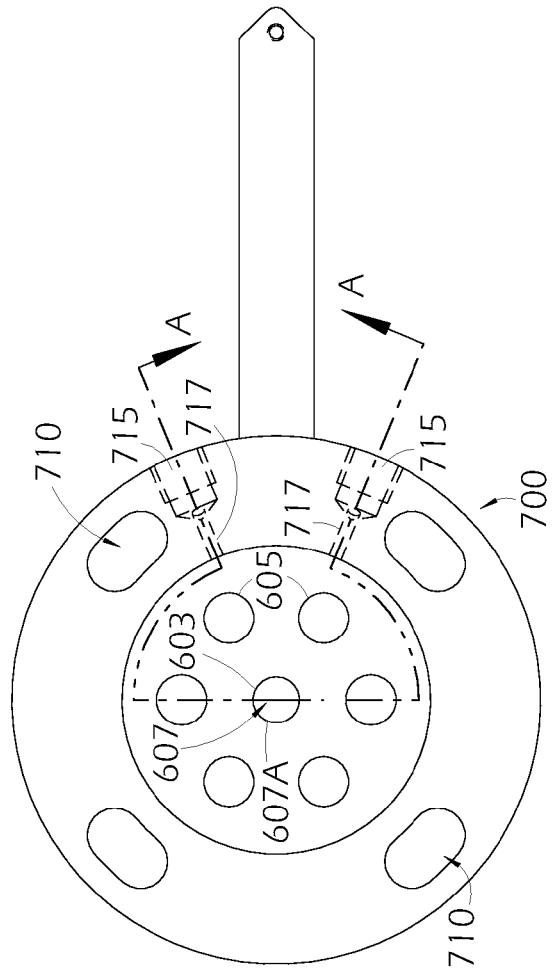
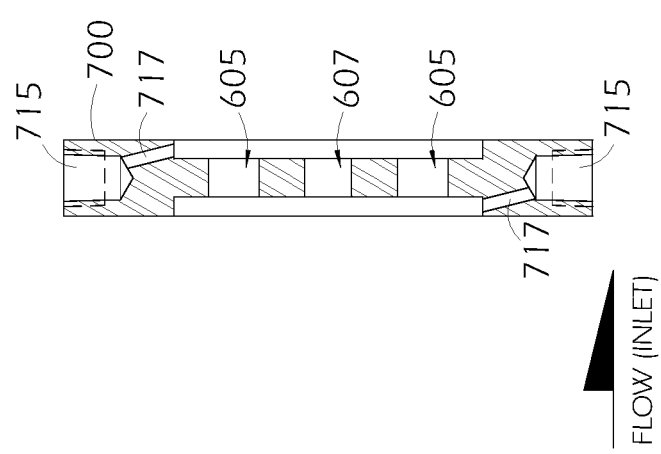
FIG. 7A
VIEW A-A
FIG. 7B ic # ORIFICE PLATES

CROSS REFERENCE TO RELATED APPLICATION

This is a continuation application claiming the benefit of U.S. patent application Ser. No. 14/489,149, which was filed on Sep. 17, 2014, which issued as U.S. Pat. No. 9,200,650 on Dec. 1, 2015, which claims the benefit of U.S. Provisional Application No. 61/937,693, which was filed on Feb. 10, 2014, and U.S. Provisional Application No. 61/883,069, which was filed on Sep. 26, 2013; all three applications are incorporated herein by reference in their entirety.

TECHNICAL FIELD

This disclosure relates to implementations of an orifice plate.

BACKGROUND

U.S. Pat. No. 7,051,765, which is incorporated herein by reference in its entirety, discloses an orifice plate for use in a conduit through which fluid flows.

As disclosed in the '765 patent, in general, the variation of a process variable across an orifice plate's surface introduces inefficiencies in a fluid flow. For example, prior art orifice plates generally experience fairly large pressure losses as a fluid flows from one side of the plate to the other. Unfortunately, to handle such large pressure losses, larger and more expensive fluid pumps are used. Also, pressure potential in prior art orifice plates is generally consumed by eddy turbulence that is random and chaotic. These eddy formations about the orifice plate reduce linearity and repeatability of any process variable measurements thereby causing a reduction in measurement accuracy. Reduced measurement accuracy leads to processes that are highly variable which, in turn, increases process costs due to greater equipment operational margins that must be maintained. If pressure can be equalized or balanced across the surface area of an orifice plate, the random and chaotic eddy formations may be greatly reduced. Thus, by balancing the flow with respect to the measured process variable, the accuracy of process variable measurement may be improved while the cost of taking such measurements may be reduced.

An orifice plate according to the '765 patent addresses these issues. More particularly, an orifice plate according to the '765 patent may balance one or more process variable associated with a fluid flow passing through the orifice plate across the surface of the orifice plate. Thus, an orifice plate according to the '765 patent may improve repeatability, linearity, and reduction of pressure loss.

However, the '765 patent does not teach how to construct an orifice plate configured to limit pipe and plate noise, erosion, cavitation, shear stress, etc. while maximizing pressure loss, and limiting flow to required values. Further, the '765 patent does not teach how to manufacture an orifice plate configured to optimize process variable measurements, minimize system pressure drop, recover pressure, recover energy, and reduce noise and other inefficiencies within a system using an orifice plate optimized through the use of a Reynolds matching (RM) equation.

BRIEF DESCRIPTION OF THE DRAWINGS

FIG. 6A illustrates an example orifice plate having an example hole pattern optimized using a Reynolds matching (RM) equation.

FIG. 6B illustrates a cross-sectional view of the orifice plate shown in FIG. 6A.

FIG. 7A illustrates another example orifice plate according to the present disclosure.

FIG. 7B illustrates a cross-sectional view of the orifice plate shown in FIG. 7A, taken along line A-A.

DETAILED DESCRIPTION

Figure 1A:
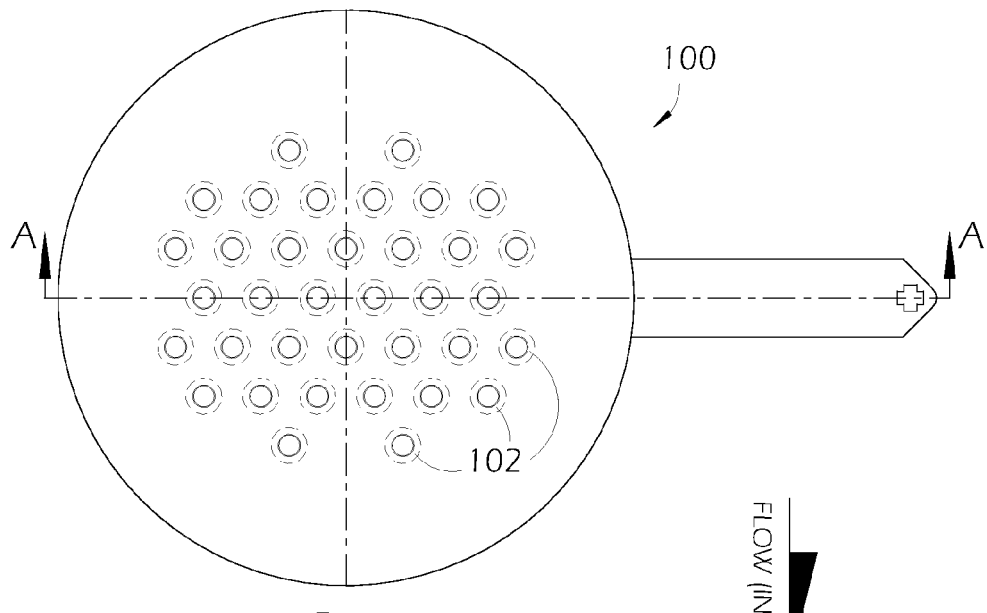
FIG. 1A illustrates an example balanced restriction orifice (BRO) plate according to the present disclosure.
Figure 1B:
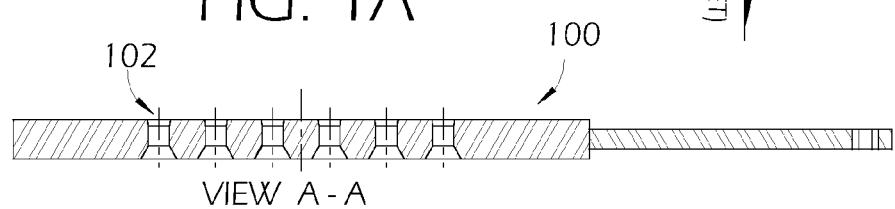
FIG. 1B illustrates a cross-sectional view of the balanced restriction orifice (BRO) plate shown in FIG. 1A, taken along line A-A.

Implementations of an orifice plate are provided. In some implementations, a balanced restriction orifice (BRO) plate configured to help maximize pressure loss is provided. In some implementations, the BRO plate may be configured to limit pipe and plate noise, erosion, cavitation, shear stress, etc. while maximizing pressure loss, and limiting flow to required values. In this way, the service life of the BRO plate may be increased. In some implementations, openings through a BRO plate may be configured to satisfy the following Velocity-Head Pressure-Loss equation: $\Delta P = k\rho V^n / 2Gc$.

In some implementations, a BRO plate may have two or more openings therethrough. In some implementations, the openings of a BRO plate may have various inlet and/or outlet shapes. These shapes include, but are not limited to, knife edge, blunt/square edge, tapered/beveled edge, or contoured edge. In some implementations, multiple BRO plates may be used in series to, for example, increase service life.

Alternatively, in some implementations, the hole pattern of an orifice plate may be configured through the use of a provided Reynolds matching (RM) equation to help improve process variable measurements, minimize system pressure drop, recover pressure, and/or reduce noise and other inefficiencies within the system using equations provided herein. In some implementations, the orifice plate configured through the use of a provided Reynolds matching (RM) equation may comprise a central circular region defined by a ring having a predetermined radius. In some implementation, the central circular region defines a hole located at the plate center having a predetermined radius and a predetermined diameter. In some implementations, the orifice plate further comprises a plurality of holes of equivalent diameter distributed around an imaginary ring having a predetermined radius, wherein the ring passes through the center of the holes. In some implementations, the holes are equally distributed around the ring. In a preferred implementations, the number of holes is six.

In some implementations, the holes of the orifice plate configured through the use of a provided Reynolds matching (RM) equation may have an inlet and/or outlet shape that may be used to optimize performance for single or multiphase fluids. These shape of the holes can include, but are not limited to, knife edge, blunt/square edge, tapered/beveled edge, or contoured edge.

In some implementations, the curvature or rounding of each hole inlet may be in the magnitude of 0.003 percent to 15.0 percent of the holes radius provides optimal flow performance, as tested.

In some implementations, iron-cross or other aperture designs may be used dependent on flow properties such as Reynolds number, density, viscosity, shear stress limits, pressure pulse limits (such as with liquid explosives), Newtonian, non-Newtonian, etc., single or multiphase fluids.

In some implementations, a through hole (i.e., a tap), may be positioned to measure the pressure drop of the flow through an orifice plate. In some implementations, a through hole may be an opening used to measure the pressure field downstream and/or upstream from the orifice plate. In some implementations, the through hole may include a smaller pipe tap hole which extends from the through hole. In this way, the tap is placed into communication with the flow passing through the orifice plate.

FIGS. 1, 2A-2G, 3B-3G, 5A, and 5B illustrate example implementations of a BRO plate. In some implementations of the present disclosure, the equations of the '765 patent have been extended to help maximize pressure loss, with and/or without flow measurement. More particularly, the following Velocity-Head Pressure-Loss equation is used in conjunction with the equations set forth in the '765 patent to design balanced restriction orifice (BRO) plates (see, e.g., FIGS. 1, 2A-2G, 3B-3G, 5A, and 5B) that may limit pipe and plate noise, erosion, cavitation, shear stress, etc. while maximizing pressure loss, and limiting flow to required values:

$$\Delta P = k \rho V^n / 2 G_c;$$

Where:
$\Delta P$=pressure loss across the plate;
n=velocity exponent;
k=velocity head loss;
$\rho$=fluid density;
V=fluid velocity; and
$G_c$=Newton's conversion constant.

In some implementations, values of n typically range between 1.8 and 2. In some implementations, the value of n may be greater than 2. In some implementations, the value of n may be less than 1.8.

In some implementations, $\Delta P$ may represent a permanent pressure loss. In some implementations, $\Delta P$ may not represent a permanent pressure loss.

Figure 2A:
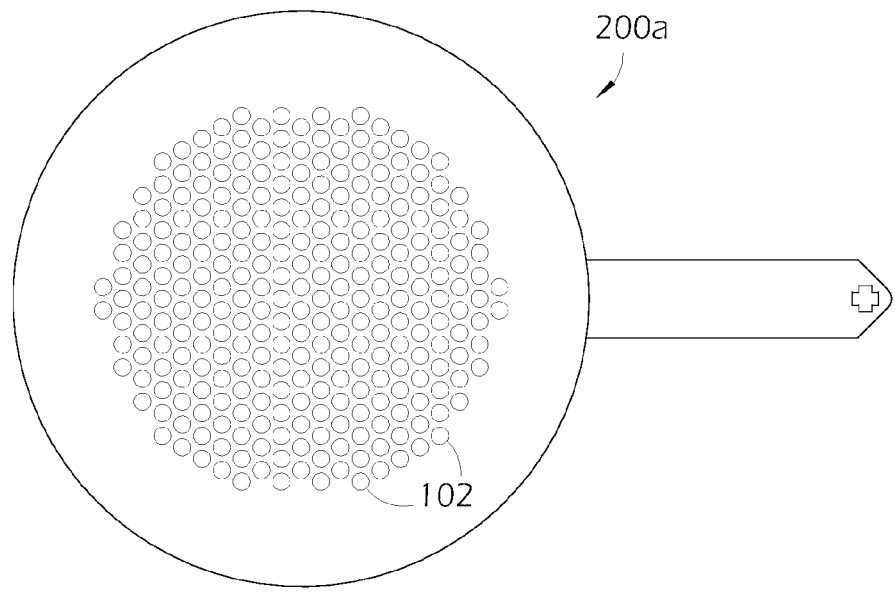
FIGS. 2A-2G illustrate other example BRO plates constructed in accordance with the present disclosure.
Figure 2B:
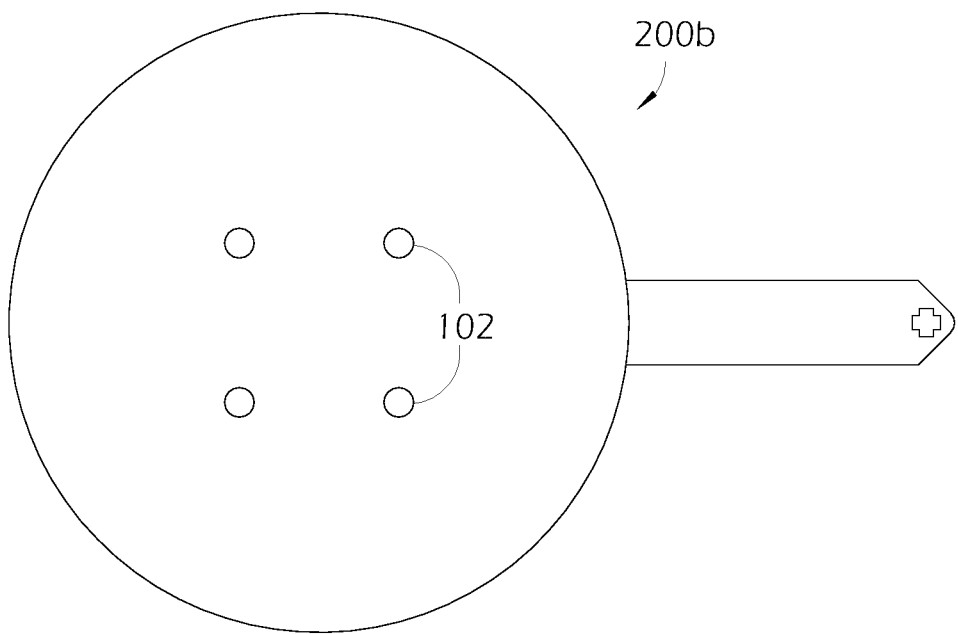
Figure 2C:
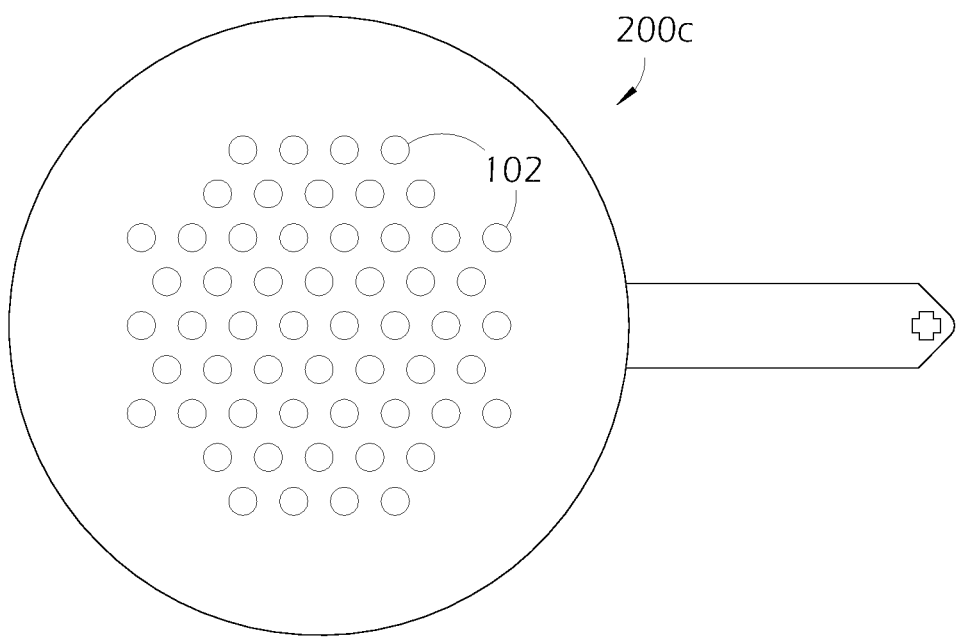
Figure 2D:
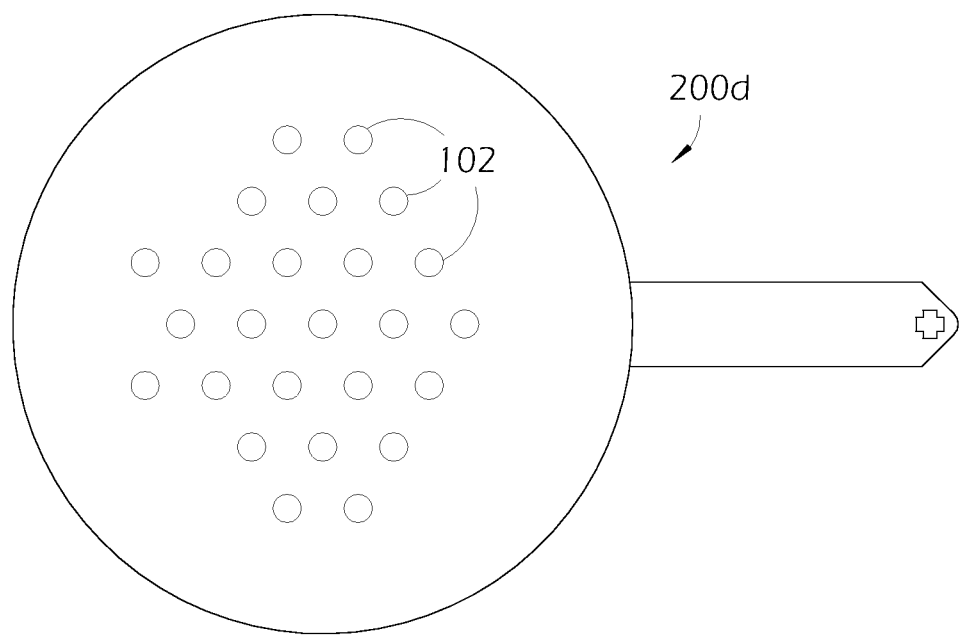
Figure 2E:
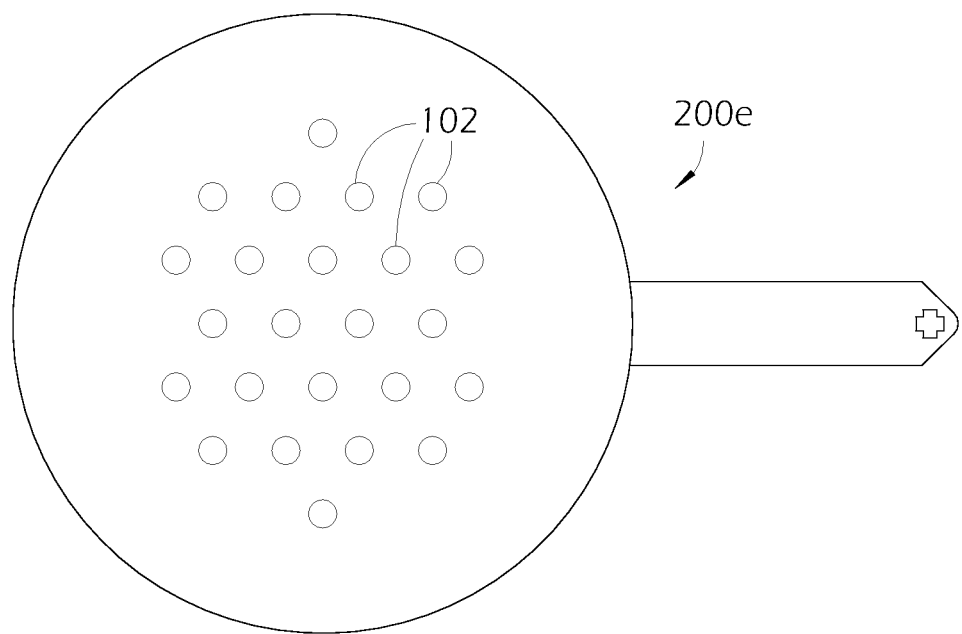
Figure 2F:
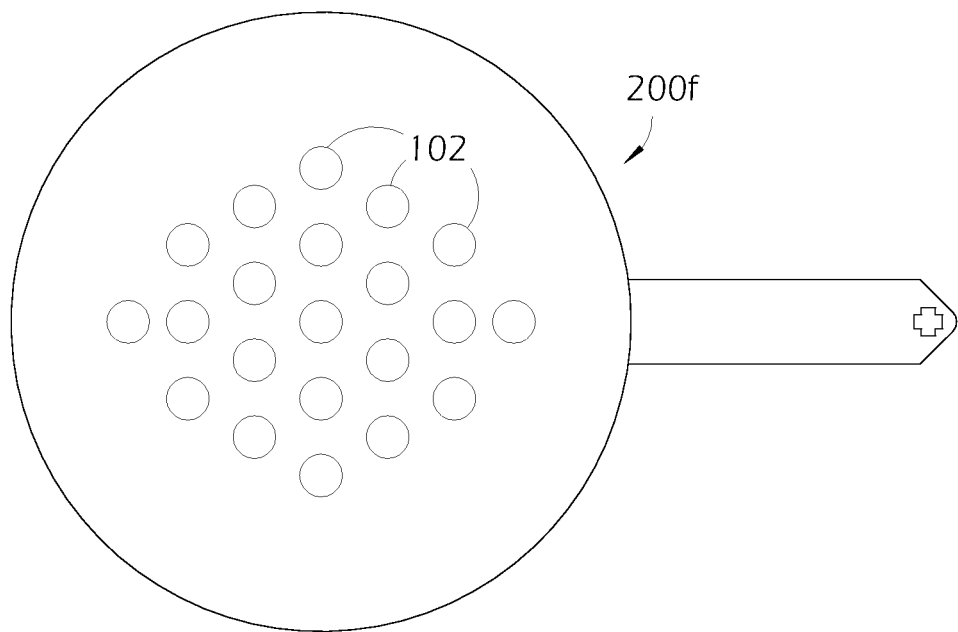
Figure 2G:
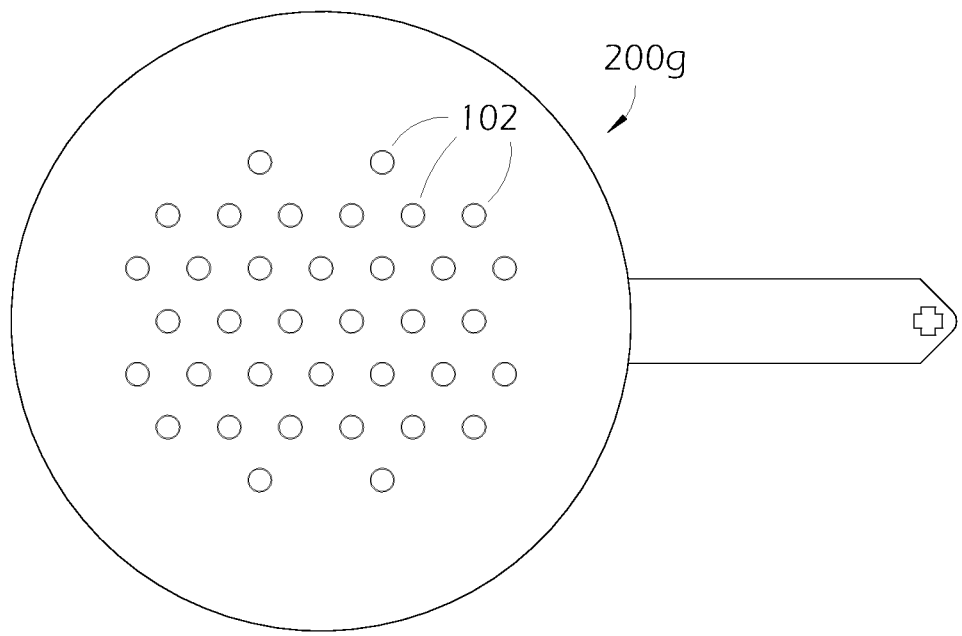

FIG. 1A illustrates an example BRO plate 100 having a plurality of holes 102 according to the present disclosure. In some implementations, a hole 102 may be an opening extending through a BRO plate. In some implementations, the diameter of each hole 102 extending through a BRO plate may vary. In some implementations, for larger pipes, many holes 102 may be required, sometimes hundreds, with many rings of holes (see, e.g., FIG. 2A). In some implementations, the number of holes 102 can range from two to thousands depending on the size of the holes and the size of plate. FIG. 2A illustrates an example BRO plate 200a that may be used for larger pipes. FIGS. 2B-2G each illustrate an example BRO plate 200b-g, respectively, according to the present disclosure.

Figure 3A:
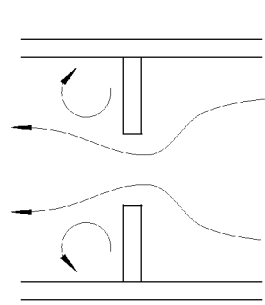
FIG. 3A illustrates a prior art restriction plate having a single restriction orifice (RO).
Figure 3A:
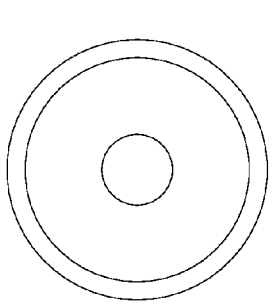

FIG. 3A illustrates a prior art restriction plate having a single restriction orifice (hole). Such designs may generate harmful eddies, vibrations, and plate noise.

Figure 3B:
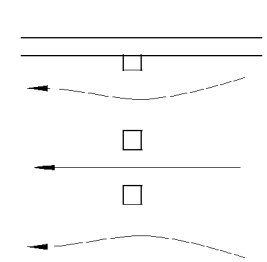
FIGS. 3B-3D illustrate example BRO plates and how example hole patterns may regulate flow across a given pressure loss.
Figure 3B:
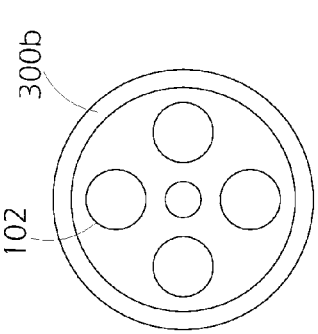
Figure 3B:
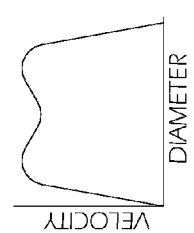
Figure 3C:
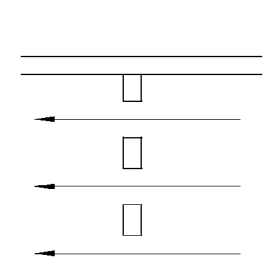
Figure 3C:
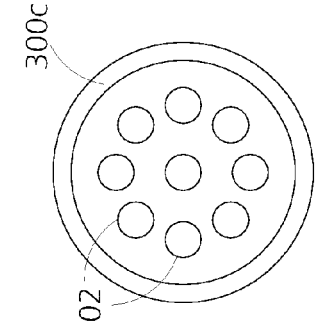
Figure 3C:
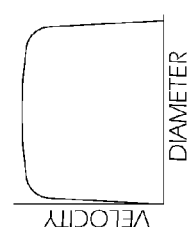
Figure 3D:
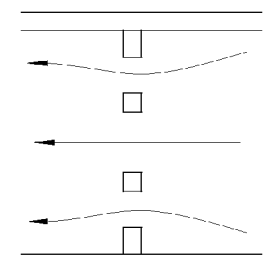
Figure 3D:
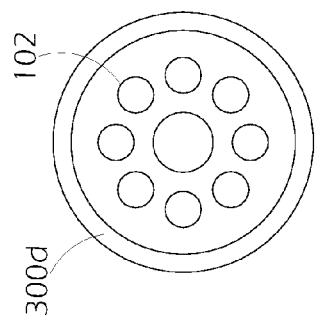
Figure 3D:
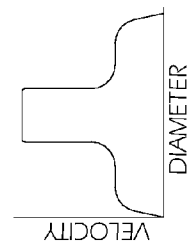
Figure 4A:
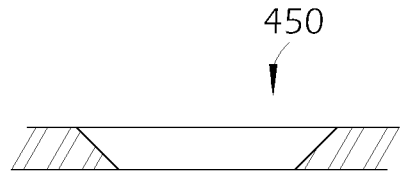
FIGS. 4A-4E illustrate implementations of inlet and/or outlet shapes.
Figure 4B:
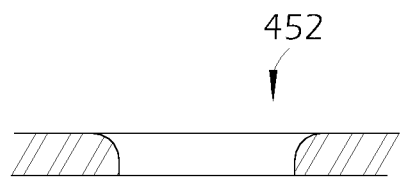
Figure 4C:
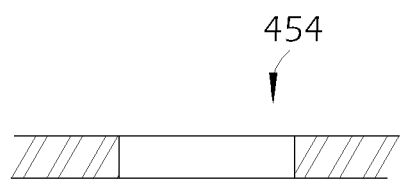
Figure 4D:
Figure 4E:

As shown in FIGS. 3B-3D, in some implementations, a BRO plate 300b-d, respectively, may regulate flow and/or velocity distribution across a given pressure loss.

In some implementations, the following balanced flow meter equation may be used to alone or in conjunction with other formulas disclosed herein to design balanced restriction orifice (BRO) plates that limit pipe and plate noise, erosion, cavitation, shear stress, etc. while maximizing pressure loss, and limiting flow to required values:

$K \rho A V^N$=Constant;
Where:
K=constant;
$\rho$=density of fluid;
A=area of holes;
V=fluid velocity; and
N=velocity exponent.

In some implementations, values for N may range between $-\infty$ and $+\infty$.

In some implementations, the value of K may vary between holes 102 extending through an example BRO plate.

In some implementations, as shown in FIG. 3B, a central hole having an opening smaller in diameter than the surrounding holes extending through a BRO plate 300b, or other multi-holed orifice plate, may be used to regulate flow across a given pressure loss. In this way N<0. In some implementations, as shown in FIG. 3C, all of the holes extending through a BRO plate 300c, or other multi-holed orifice plate, may have the same or similar diameter and may be used to regulate flow across a given pressure loss. In this way N=0. In some implementations, as shown in FIG. 3D, a central hole having an opening larger in diameter than the surrounding holes extending through a BRO plate 300d, or other multi-holed orifice plate, may be used to regulate flow across a given pressure loss. In this way N>0.

As shown in FIGS. 4A-4E, in some implementations, various inlet and/or outlet shapes for the hole(s) 102 extending through a BRO plate may be used to optimize performance for single or multiphase fluids in a flow. In some implementations, inlet and/or outlet shapes may include, but are not limited to, knife edge 450 (see, e.g., FIG. 4A), blunt/square edge 454 (see, e.g., FIG. 4C), tapered/beveled edge 456 (see, e.g., FIG. 1B and FIG. 4D), contoured 452 (see, e.g., FIG. 4B), or bi-directional contoured edge 458 (see, e.g., FIG. 4E).

In some implementations, knife edge 450 inlet and/or outlet shapes may have a high k (>1). In some implementations, blunt/square edge 454 inlet and/or outlet shapes may have a moderate to high k. In some implementations, tapered/beveled edge 456 inlet and/or outlet shapes may have a moderate to low k. In some implementations, contoured 452 inlet and/or outlet shapes may have a low to very low k (<<1). In some implementations, individual and/or combinations of inlet and/or outlet shapes of the holes 102 may be used to adjust the value of k in the $\Delta P = k \rho V^n / 2 G_c$ equation.

In some implementations, plate inlet and/or outlet shapes can affect pressure loss, noise, erosion, cavitation, accuracy, etc. In some implementations, low k value shapes are preferred for measurement, and high k value shapes are preferred for restriction plates. In some implementations, for systems requiring low noise, cavitation, erosion, etc., moderate k value shapes are preferred.

In some implementations, various plate inlet and/or outlet shapes are used for single phase fluids (gas or liquid) and multi-phase fluid systems (e.g., gas, liquid, solid). In some implementations, tapered inlet and/or outlet shapes are preferred in multi-phase fluid systems.

In some implementations, iron-cross or other aperture designs may be used dependent on flow properties such as Reynolds number, density, viscosity, shear stress limits, pressure pulse limits (such as with liquid explosives), Newtonian, non-Newtonian, etc., single or multiphase fluids.

Figure 5A:
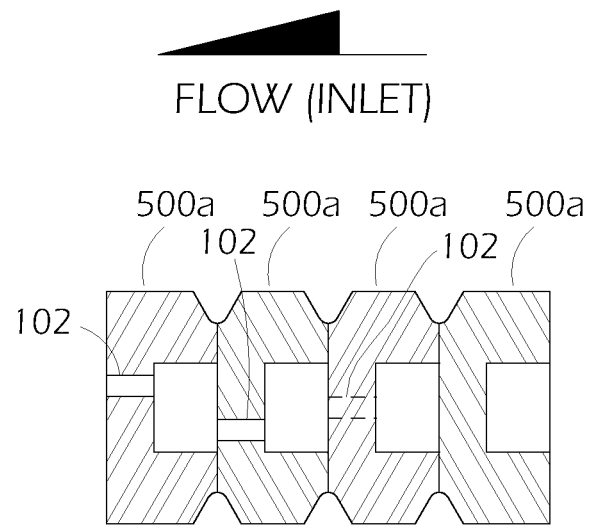
FIGS. 5A-5B illustrate multiple BRO plates secured together in series.
Figure 5B:
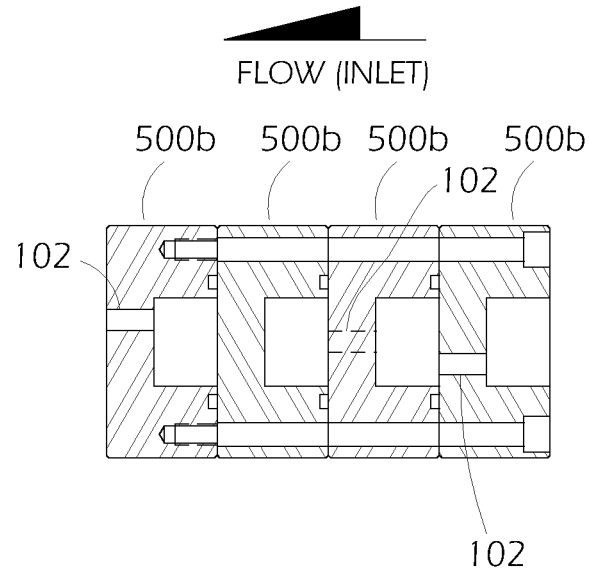
Figure 8A:
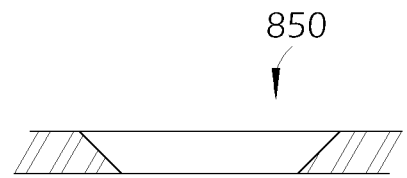
FIGS. 8A-8E illustrate implementations of inlet and/or outlet shapes
Figure 8B:
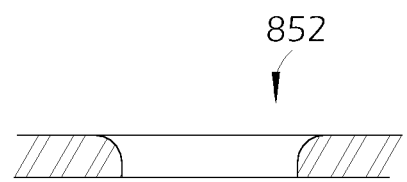
Figure 8C:
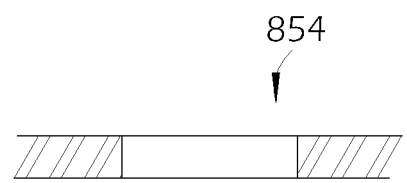
Figure 8D:
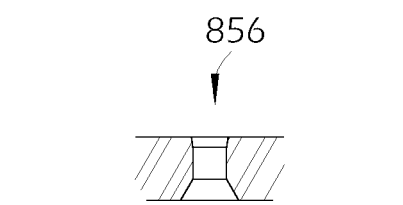
Figure 8E:
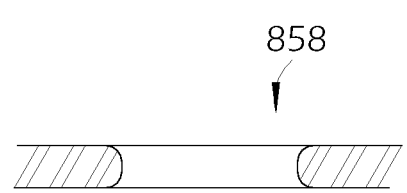

As shown in FIGS. 5A and 5B, in some implementations, multiple BRO plates 500a, 500b in series (integral or individual, separate plates) can be used to limit noise, erosion, etc. to increase service life. In some implementations, as shown in FIGS. 5A and 5B, two or more orifice plates 500a, 500b may be welded and/or bolted together, respectively. In some implementations, when one or more BRO plates are placed in series, each BRO plate may be rotated so that its holes 102 are 90° (degrees) out of phase with the holes 102 of a BRO plate that may be immediately in front of or behind it (see, e.g., FIG. 5B). In this way, the holes of one BRO plate do not align with the holes of a BRO plate placed in front of and/or behind it. In some implementations, when one or more BRO plates are placed in series, each BRO plate may be rotated so that its holes are more than 90° (degrees) or less than 90° (degrees) out of phase with the holes of a BRO plate that may be immediately in front of or behind it. In some implementations, when one or more BRO plates are placed in series, each BRO plate may be rotated so that its holes are aligned with the holes of a BRO plate that may be immediately in front of and/or behind it.

In some implementations, a BRO plate constructed in accordance with the teachings of the present disclosure, may accommodate bi-directional flow within a conduit, pipe, etc. Special calibrations and correction factors may be required to meet specifications. In some implementations, the holes 102 of a BRO plate designed to accommodate bi-directional flow may have knife edge, blunt/square edge, tapered/beveled edge, and/or contoured inlet and/or outlet shapes, for example. Current flow apparatuses are limited to one-directional flow applications.

In some implementations, as shown in FIG. 3C, the BRO plate may cause a flow through a conduit to have a uniform velocity and/or pressure profile (i.e., act as a flow conditioner plate).

In some implementations, the BRO plate may reduce or eliminate harmful eddies and/or vibrations within a conduit. In some implementations, a BRO plate may generate plate noise of less than 82 dB based on hole pattern and/or design (see, e.g., FIG. 1B). In some implementations, swirls of eddies are eliminated from the flow due to the distribution and/or number of holes extending through a BRO plate. In this way, eddy stresses and/or vibrations are eliminated.

In some implementations, a BRO plate may be used with single phase, two phase, and/or three phase fluid flows.

In some implementations, the BRO plate may be of sufficient thickness to resist pressure and momentum stresses and thereby have a longer service life. In some implementations, the BRO plate may have a service life lasting 10 times, or more, longer than a standard orifice plate having only a single opening (hole).

In some implementations, as a result of the holes 102 extending therethrough and/or the inlet and/or outlet shapes thereof, a BRO plate may better resist cavitation and/or erosion. In this way, service life is extended.

In some implementations, the BRO plate may reduce and/or eliminate pipe erosion.

In some implementations, the BRO plate may be self-draining and/or self-venting. In some implementations, the BRO plate may be constructed to handle hydraulic-hammer.

As shown in FIGS. 6A and 6B, in some implementations of the present disclosure, an orifice plate 600 having an example hole pattern may be optimized using a Reynolds matching (RM) equation. In some implementations, the orifice plate 600 comprises a central circular region 607 defined by a ring 607A having a radius $R_1$. In some implementation, the central circular region 607 defines a hole 603 located at the plate center having a radius and a diameter $D_1$. In some implementations, the orifice plate 600 further comprises a plurality of holes 605 of equivalent diameter $D_2$ distributed around an imaginary ring 609 having a plate radius $R_2$ wherein the ring 609 passes through the center of the holes 605. In some implementations, the holes 605 are equally distributed around the ring. In a preferred implementations, the number of holes 605 is six. In some implementations, the number of holes 605 is greater than or less than six.

In some implementations, the central circular region 607 may be an opening extending through the orifice plate 600. In some implementations, there may be more than one hole 603 located within the central circular region 607. In some implementations, there may be no hole in the central circular region 607. In some implementations, the plurality of holes 605 may be openings extending through the orifice plate 600. In some implementations, the plurality of holes 605 may be circular. In some implementations, one or more holes of the orifice plate 600 (i.e., holes 605 and/or hole(s) 603) may be any suitable shape.

According to the present disclosure, a Reynolds matching (RM) equation may be used to optimize some implementations of the orifice plate disclosed in the '765 patent. More particularly, the following equations can be used in conjunction with the equations set forth in the '765 patent to help optimize process variable measurements, minimize system pressure drop, recover pressure, recover energy, and reduce noise and other inefficiencies within a system using an orifice plate having a hole distribution pattern described with reference to FIG. 6A:

$$N_{RE,1} = \frac{D_1 \rho V_1}{\mu} \tag{1a}$$

$$N_{RE,2} = \frac{D_2 \rho V_2}{\mu} \text{ where,} \tag{1b}$$

$$N_{RE,1} = N_{RE,2} \tag{1c}$$

therefore, $$R_2 = (D_p + (D_1 + 2(RCo)))/4 \tag{2}$$

$$D_1 V_1 = D_2 V_2 \tag{3}$$

$$\frac{V_2}{V_1} = \left(1 - \frac{R_2}{R_p}\right)^b \tag{4}$$

$$Pi/4(D_1^2 + ND_2^2) = Pi/4(\beta^2 Dp^2) \tag{5}$$

Where:

$N_{RE,1}$, $N_{RE,2}$ is a Reynolds number for the holes 605, 603, respectively;

$D_p$=inside diameter of a pipe or conduit;

$\rho$=density of a fluid;

V=velocity of the flow;

$\mu$=viscosity of the fluid;

$D_1$=diameter of a hole 603 within the central circular region 607;

$D_2$=diameter of a hole 605 located on the imaginary ring 609;

$V_1$=velocity of the flow through the center of a hole 603 within the central circular region 607;

$V_2$=velocity of the flow through the center of a hole 605 having a diameter $D_2$ centered on an imaginary ring 609 having a plate radius $R_2$;

$R_p$=radius of a pipe or conduit;

$R_2$=distance from center of plate to imaginary ring 609;

RCo=radius of hole 603 contour;

b=a function of $N_{RE}$. In some implementations, values for b range from 1/7 to 1/10 in turbulent flow. In some implementations, the value of b is ½ for laminar flow;

N=number of holes 605 distributed around an imaginary ring 609 having a plate radius $R_2$ wherein the ring 609 passes through the center of the holes 605. In some implementations, the optimum number of holes is six, such as with a "Benzene-Ring";

$\beta$=orifice plate Beta ratio. In some implementations $\beta$ is the ratio of the diameter of a single-holed orifice plate to the diameter of the pipe (Dsingle-hole/Dp). One of ordinary skill in the art would know how to calculate $\beta$.

The above equations are solved iteratively. Using the above equations, symmetrical clearance between the holes 603, 605 and a pipe may be optimized. Using the above equations, implementations of an orifice plate 600 may optimize the diameter of the plurality of holes 605 to improve process variable measurements, minimize system pressure drop, recover pressure, and reduce noise and other inefficiencies within the system.

FIGS. 7A and 7B illustrate another example orifice plate 700 according to the present disclosure. In some implementations, the orifice plate 700 may be the same as the orifice plate 600 of FIG. 6A but further comprises a plurality of slots 710 and/or through holes 715 (i.e., taps).

In some implementations, the orifice plates 600, 700 may be circular. In some implementations, the term orifice plate may include any structural element having a hole pattern formed therethrough.

In some implementations, the central circular region 607 may be any suitable shape. In some implementations, the central circular region 607 may be an opening extending through an orifice plate 600, 700 (see, e.g., FIGS. 6A and 7A).

In some implementations, the orifice plate 600, 700 may have circular shaped holes 605 therethrough. In some implementations, the holes 605 may be any suitable shape.

As shown in FIGS. 8A-8E, in some implementations, various inlet and/or outlet shapes for the holes 603, 605 extending through an orifice plate 600, 700 may be used to optimize performance for single or multiphase fluids. In some implementations, inlet and/or outlet shapes may include, but are not limited to, knife edge 850 (see, e.g., FIG. 8A), blunt/square edge 854 (see, e.g., FIG. 8C), tapered/beveled edge 856 (see, e.g., FIG. 8D), contoured 852 (see, e.g., FIG. 8B), or bidirectional contoured edges 858 (see, e.g., FIG. 8E).

In some implementations, knife edge 850 inlet and/or outlet shapes may have a high k (>1). In some implementations, blunt/square edge 854 inlet and/or outlet shapes may have a moderate to high k. In some implementations, tapered/beveled edge 856 inlet and/or outlet shapes may have a moderate to low k. In some implementations, contoured 852 inlet and/or outlet shapes may have a low to very low k (<<1).

In some implementations, plate inlet and/or outlet shapes can affect pressure loss, noise, erosion, cavitation, accuracy, etc. In some implementations, low k value shapes are preferred for measurement, and high k value shapes are preferred for restriction plates. In some implementations, for systems requiring low noise, cavitation, erosion, etc., moderate k value shapes are preferred.

In some implementation, as shown in FIG. 6B, an orifice plate 600 may have holes 603, 605 having a contoured inlet shape.

In some implementations, providing curvature or rounding of each hole 605, 603 inlet in the magnitude of 0.003 percent to 15.0 percent of the holes 605, 603 radius may provide optimal flow performance, as tested. In some implementations, providing curvature or rounding of each hole 605, 603 inlet in the magnitude of 0.003 percent to 50.0 percent of the holes 205, 203 radius may provide optimal flow performance.

In some implementations, iron-cross or other aperture designs may be used dependent on flow properties such as Reynolds number, density, viscosity, shear stress limits, pressure pulse limits (such as with liquid explosives), Newtonian, non-Newtonian, etc., single or multiphase fluids.

In some implementations, an orifice plate optimized by the above listed Reynolds matching equation may generate plate noise of less than 80 dB based on hole pattern and/or distribution (see, e.g., FIGS. 6A and 6B). In some implementations, an orifice plate optimized by the Reynolds matching equation may generate plate noise of less than 80 dB based on the inlet and/or outlet shape of the holes extending therethrough (see, e.g., FIGS. 6A and 6B).

In some implementations, an orifice plate (see, e.g., FIG. 6A) optimized by the above listed Reynolds matching equation may cause a flow through a conduit to have a uniform velocity and/or pressure profile (i.e., act as a flow conditioner plate).

In some implementations, there may be no slots 710 extending through an orifice plate (see, e.g., FIG. 6A). In some implementations, there may be four slots 710 extending through an orifice plate 700 (see, e.g. FIG. 7A). In some implementations, there may be more than four, or less than four, slots in the orifice plate. In some implementations, the slots 710 may be used to align the orifice plate about bolts used to secure the orifice plate between two flanges. In some implementations, the slots 710 may allow up to 45 degrees of rotation relative to the bolts used to secure the orifice plate between the two flanges. In some implementations, the slots 710 of the orifice plate are not for flow.

Figure 10:
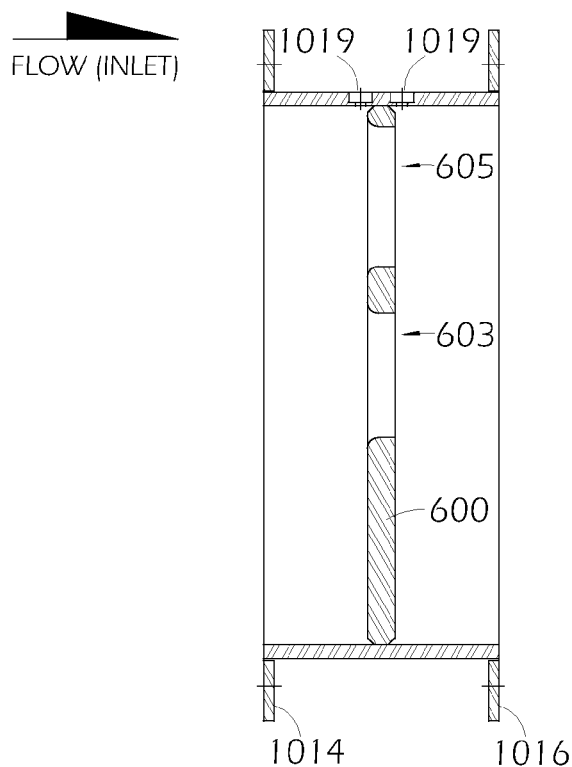
FIG. 10 illustrates an example orifice plate secured between two flanges.

As shown in FIGS. 7B and 10, in some implementations, a through hole (i.e., a tap) may be positioned to measure the pressure drop and/or pressure increase of a flow through an orifice plate (see, e.g., FIG. 7B, element 715 and FIG. 10, element 1019). In some implementations, a through hole 715, 1019 may be an opening used to measure the pressure field downstream and/or upstream from a face of an orifice plate. In some implementations, one or more through holes may be used to measure the upstream and/or downstream velocity of a flow through an orifice plate.

Figure 11:
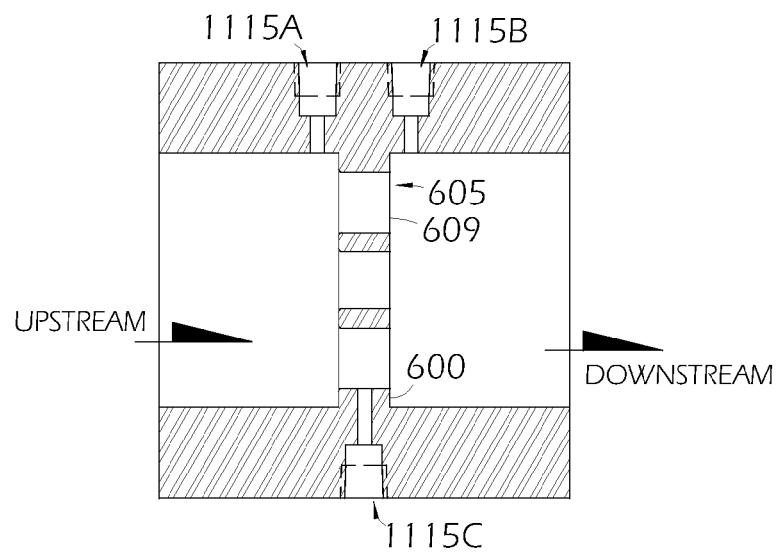
FIG. 11 illustrates example through hole locations on an orifice plate constructed in accordance with the present disclosure.

As shown in FIG. 11, in some implementations, a tap 1115C (i.e., a ring hole tap) may extend into an interior portion of a hole 605 centered on a ring 609 of an orifice plate 600. The interior portion of a hole 605 being the area of the hole which lies between the inlet side and outlet side of the hole. As shown in FIG. 11, in some implementations, a through hole 1115A, 1115B, 1115C may be positioned upstream (e.g., through hole 1115A), downstream (e.g., through hole 1115B), and/or through an interior portion (e.g., through hole 1115C) of a hole 205 of an orifice plate 600. In this way, accurate flow measurements for both high and low flow service may be taken. Such a configuration may only use two through holes for a given measurement.

In some implementations, a through hole 715 (i.e., a tap) may include a smaller pipe tap hole 717 which extends from the tap 715. In this way, the tap 715 is placed into communication with the flow passing through the orifice plate 700 (see, e.g., FIG. 7B).

In some implementations, the placement of the one or more through holes 715 does not affect a flange designs stresses. In some implementations, one or more through holes may be placed 0.5" or further from a face of an orifice plate. In this way, optimal accuracy of a measured flow may be obtained by avoiding flow stagnation. In some implementations, one or more through holes may be placed at flow-stagnation points within a flow stream on the upstream and/or downstream side of an orifice plate. In some implementations, one or more through holes may be placed between 0.0" and 1.0", inclusive of 0.0" and 1.0", from a face of an orifice plate. In some implementations, the diameter of a through hole and/or the pipe tap hole may range between 0.125" and 0.5". In some implementations, the diameter of a through hole and/or the pipe tap hole may be greater than 0.5" or less than 0.125".

In some implementations, the one or more through holes may be configured to provide a differential pressure sensor tap fitting. In some implementations, the differential pressure sensor tap fitting may be directly connected to the orifice plate. In some implementations, the differential pressure sensor fittings may be indirectly connected to the orifice plate. In some implementations, the one or more through holes may be configured to provide sensor fittings for other flow measurement devices.

Figure 9A:
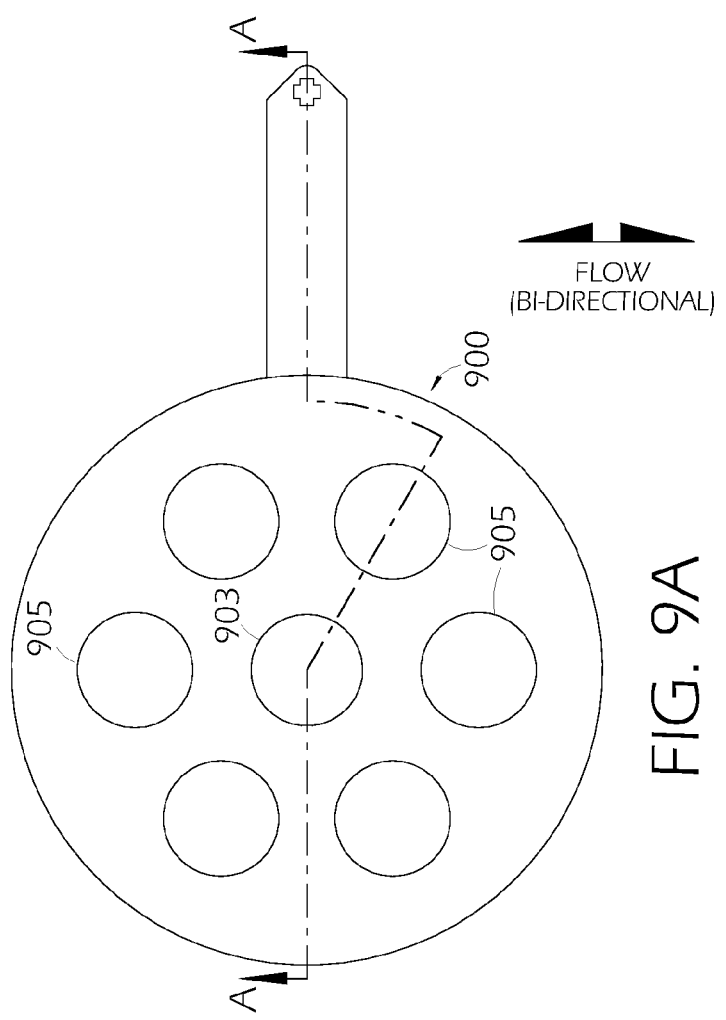
FIG. 9A illustrates an implementation of an orifice plate configured to accommodate a bi-directional flow in accordance with the present disclosure.
Figure 9B:
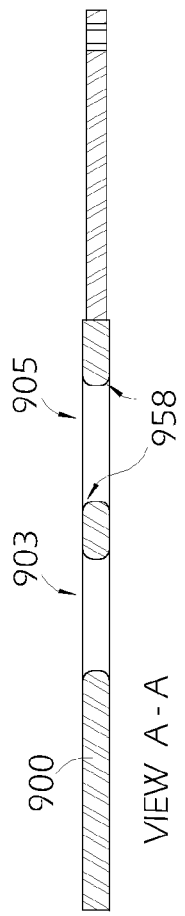
FIG. 9B illustrates a cross-sectional view of the orifice plate shown in FIG. 9A, taken along line A-A.

A shown in FIGS. 9A and 9B, implementations of the orifice plate 900 of the present disclosure optimized by the above equations can accommodate bi-directional flow within a conduit, pipe, etc. Special calibrations and correction factors may be required to meet specifications. In some implementations, an orifice plate 900 optimized for bi-directional flow may have bi-directional contoured edges 958 about the holes 905, 903 (see, e.g., FIG. 9B). In this way, the holes may be contoured to facilitate a bi-directional flow.

In some implementation, optimal performance of an orifice plate may be limited to one-directional flow applications. In some implementations, optimal performance of an orifice plate may not be limited to one-directional flow applications.

In some implementations, an orifice plate 100, 200a-200g, 300b-300d, 500a-500b, 600, 700, 900 optimized by the above equation(s) may be secured to a conduit using two flanges 1014, 1016. In this way, an orifice plate secured between the flanges 1014, 1016 may be used to control and/or condition the flow through the conduit (see, e.g., FIG. 10, element 600). Such conduits and the joining thereof are well known in the art and are not limitation of the present invention Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A restriction orifice plate comprising:
   a plate configured to be positioned in a conduit through which a fluid passes, wherein the plate includes two or more openings therethrough that are positioned on the plate to induce a pressure loss of a fluid passing therethrough;
   each of the two or more openings include an inlet and an outlet, the inlets of the two or more openings are the same diameter and the outlets of the two or more openings are the same diameter;
   wherein the two or more openings are positioned on the plate to satisfy the flow-based relationship, $K\rho AV^N$=Constant, so that N=0 as a fluid passes through the two or more openings, where,
   K=constant;
   $\rho$=fluid density; A=area of the two or more openings;
   V=fluid velocity;
   N=velocity exponent; and
   wherein the two or more openings of the plate are configured to equally satisfy the relationship, $\Delta P = k\rho V^n/2G_c$, where,
   $\Delta P$=pressure loss across the plate;
   n=velocity exponent;
   k=velocity head loss;
   $\rho$=fluid density;
   V=fluid velocity; and
   $G_c$=Newton's conversion constant.

2. The restriction orifice plate of claim 1, wherein the plate includes a non-perforated central region about which the two or more openings are positioned.

3. The restriction orifice plate of claim 1, wherein the values for n range between 1.8 to 2, inclusive of 1.8 and 2.

4. The restriction orifice plate of claim 1, wherein the inlet of each of the two or more openings has a blunt edge.

5. The restriction orifice plate of claim 1, wherein the inlet of each of the two or more openings has a knife edge.

6. The restriction orifice plate of claim 1, wherein the inlet of each of the two or more openings has a tapered beveled edge.

7. The restriction orifice plate of claim 1, wherein the inlet of each of the two or more openings has a contoured edge.

8. The restriction orifice plate of claim 1, wherein the outlet of each of the two or more openings has a blunt edge.

9. The restriction orifice plate of claim 1, wherein the outlet of each of the two or more openings has a knife edge.

10. The restriction orifice plate of claim 1, wherein the outlet of each of the two or more openings has a tapered beveled edge.

11. The restriction orifice plate of claim 1, wherein the outlet of each of the two or more openings has a contoured edge.

12. The restriction orifice plate of claim 1, wherein the inlet of each of the two or more openings has a contoured edge and wherein the outlet of each of the two or more openings has a contoured edge.

13. A method of using a plurality of restriction orifice plates constructed in accordance with claim 1, the method comprising:
    placing at least a first restriction orifice plate according to claim 1 and a second restriction orifice plate according to claim 1 in series;
    rotating at least the first restriction orifice plate so that the two or more openings of the first restriction orifice plate are out of phase with the two or more openings of the second restriction orifice plate; and
    installing the series of restriction orifice plates between two portions of a conduit.

14. The method of claim 13, further comprises rotating at least the first restriction orifice plate so that the two or more openings of the first restriction orifice plate are 90 degrees out of phase with the two or more openings of the second restriction orifice plate.

15. The restriction orifice plate of claim 1, wherein N>0 for the relationship, $K\rho AV^N =$ Constant.

16. The restriction orifice plate of claim 1, wherein N<0 for the relationship, $K\rho AV^N =$ Constant.

* * * * *